Feb. 18, 1964  R. P. MARVIN  3,121,795
PHOTOVOLTAIC APPARATUS FOR MEASURING DISPLACEMENT OF AN ELEMENT
Filed May 5, 1961
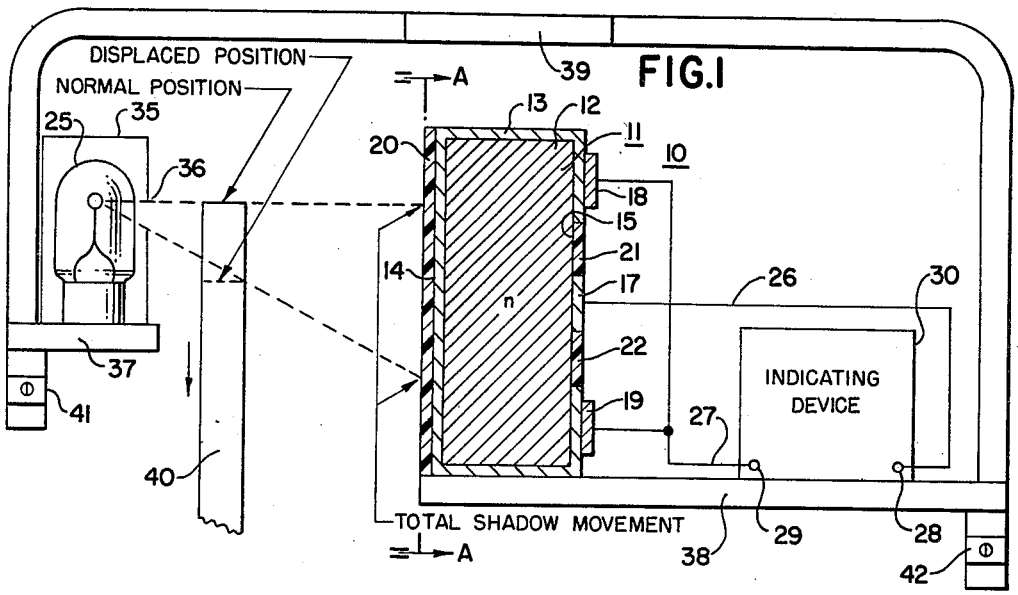
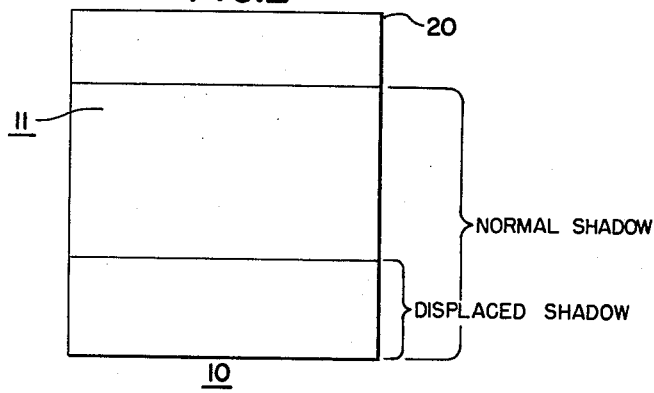
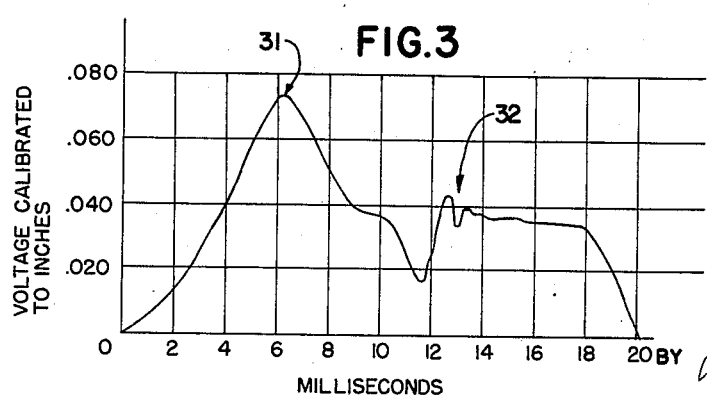
INVENTOR
RICHARD P. MARVIN
HIS ATTORNEYS

United States Patent Office 3,121,795
Patented Feb. 18, 1964

3,121,795
PHOTOVOLTAIC APPARATUS FOR MEASURING DISPLACEMENT OF AN ELEMENT
Richard P. Marvin, Dayton, Ohio, assignor to The National Cash Register Company, Dayton, Ohio, a corporation of Maryland
Filed May 5, 1961, Ser. No. 108,157
1 Claim. (Cl. 250—212)

This invention relates to the inspection of movable elements in order to detect a displacement thereof, and more particularly to an apparatus for detecting displacement of a movable element.

It is an object of the present invention to provide a process for inspecting movable elements for detection of displacement thereof.

It is a further object of the present invention to provide an apparatus for carrying out the process of the invention.

It is a further object of the present invention to provide an apparatus for indicating the movement or displacement of a movable element with a high degree of linearity, sensitivity, and accuracy.

It is a further object of the present invention to provide an apparatus for indicating the displacement of a movable element which does not add mass to the element, and which is economical and may be simply and easily set up and calibrated.

It is a further object of the present invention to provide an apparatus with the ability to manifest a displacement versus time indication relative to a moving element or to manifest the mechanical vibration amplitude and frequency of the moving element.

It is a further object of the present invention to provide an apparatus for indicating the movement or vibration of a movable element which utilizes a photovoltaic element having a large surface area for exposure to incident radiation.

In accordance with the present invention, the process of inspecting a movable element to detect displacement or movement thereof comprises arranging the movable element, a source of radiant energy, and a photosensitive element in such a manner that the movable element prevents radiant energy from the source of radiant energy from falling on a portion of the photosensitive element, and detecting change in electrical output of the photosensitive element caused by movement of the movable element.

In accordance with the present invention, the apparatus for detecting displamement of a movable element comprises a source of radiant energy; a photosensitive element for developing an electrical output the magnitude of which is dependent on the amount of surface area of the photosensitive element exposed to incident radiant energy from the source; means for arranging the source of radiant energy, the photosensitive element, and the movable element relative to each other in such a way that the movable element prevents radiant energy from the source from falling on a portion of the surface area of the photosensitive element, movement of the movable element causing more or less of the surface area of the photosensitive element to be exposed to radiant energy from the source; and means for detecting changes in the magnitude of the electrical output of the photosensitive element caused by movement thereof.

In accordance with an important feature of the present invention, the apparatus for indicating movement of a movable element comprises a source of radiant energy and a photosensitive element. The photosensitive element is preferably of the solar cell type. It comprises a semiconductor body including a zone of one conductivity type and, contiguous thereto, for forming a large area planar p-n junction, a surface zone of opposite conductivity type, and ohmic connections to the two zones for developing a voltage thereacross. The magnitude of the voltage developed across the ohmic connections is dependent on the amount of area of the surface zone exposed to incident radiant energy from the source. The area of the planar p-n junction of the photosensitive element is sufficiently large to cause significantly large voltages to be developed across the ohmic connections in response to vibration or movement of the movable element and significantly different voltages in response to various degrees of displacement of the movable element. The movable element, the source of radiant energy, and the photosensitive element are so arranged or positioned relative to each other that the movable element prevents radiant energy from the source from falling on an area or portion of the surface zone of the photosensitive element. A movement or vibration of the movable element causes more or less of the surface zone of the photosensitive element to be exposed to radiant energy from the source, whereby different voltages are developed across the ohmic connections. Means are also provided responsive to the voltages developed across the ohmic connections of the photosensitive element for indicating the movement or vibration of the movable element and the extent of displacement thereof.

In accordance with another important feature of the present invention, means may also be provided responsive to the voltages developed across the ohmic connections of the photosensitive device for manifesting a displacement versus time indication relative to the movable element whereby its velocity may be determined.

Other objects and features of the present invention will be pointed out in the following description and claim and illustrated in the accompanying drawing, which discloses, by way of example, the principle of the invention and the best mode which has been contemplated of applying that principle.

In the drawing, in which like reference numerals designate like components:

FIG. 1 is a diagrammatic representation of the apparatus according to the invention for detecting displacement of a movable element;

FIG. 2 is a view of the surface zone of the preferred form of photosensitive element taken along the line A—A of FIG. 1, and illustrates the blocking effect which a movable element has relative to radiant energy directed towards that surface zone; and FIG. 3 is a graph of a representative waveshape showing the voltage changes occurring across the ohmic connections of the photosensitive element and indicating the manner in which this waveshape may be used for dynamic measurement of the displacement of the movable element and for indicating its vibration.

Referring now to the drawing, the apparatus for detecting displacement of a movable element comprises a source of radiant energy 25, shown as a light bulb, a photosensitive element 10, and a detecting or indicating device 30. The source of radiant energy 25 may be provided with a shield 35 to direct light from the source through an opening 36 towards the photosensitive element 10. The source of radiant energy 25 is supported on a base member 37, while the photosensitive element 10 and the detecting device 30 are supported on a base member 38. A carrying means or handle 39 is provided for the displacement-detecting apparatus. One end of the handle 39 is secured to the base member 37, while its other end is secured to the base member 38.

A movable element 40, which may be considered associated with, or a part of, a machine, is arranged between the source of radiant energy 25 and the photosensitive element 10. In the illustrated embodiment, this arrangement is effected by so locating the displacement-detecting apparatus, including the source of radiant energy 25 and the photosensitive element 10, that radiant energy from the source 25 is prevented from falling on a portion of the photosensitive element 10. The displacement-detecting apparatus is provided with clamping means 41 and 42, adapted to cooperate with parts (not shown) of the machine which includes the movable element 40. The displacement-detecting apparatus is preferably so located with respect to the movable element 40 that the distance from the source of radiant energy 25 to the element 40 is less than the distance from the element 40 to the photosensitive element 10. Accordingly, an effective optical magnification of any movement of the element 40 is achieved. It is obvious that in some cases it may be more advantageous or desirable to position the movable element 40 rather than the displacement-detecting apparatus.

The photosensitive element 10 in the illustrated and preferred embodiment of the present invention is a solar cell of the type described in United States Letters Patent No. 2,780,765, granted to Daryl M. Chapin et al. on February 5, 1957. The photosensitive element 10 comprises a silicon body 11, which includes an inner n-type zone 12 and an outer p-type zone 13. The p-type zone 13 is extremely thin, at least on the front surface 14, which is exposed to radiation from the source of radiant energy 25, so as to be transparent as possible to the incident radiant energy, which should penetrate as closely as possible to the p-n junction. Low-resistance connections, in the form of elongated strips 17, 18, and 19, of metal, on the back surface 15 of the photosensitive element 10, are provided for the n- and p-type zones, leaving the front surface available for exposure to incident radiant energy. The intermediate strip 17 makes connection to the surface of the n-type zone for exposure to incident radiant energy, and the strips 18 and 19, on opposite sides thereof, each make connection to the p-type zone. A thin coating 20, of polystyrene, is provided on the front surface 14 of the photosensitive element 10 to minimize reflection losses. In order to maintain a high leakage resistance between the strips 18 and 19 and the strip 17, the intermediate regions 21 and 22 are coated with wax or other suitable compound.

In order to effect a static measurement of a displacement of the movable element 40, the displacement-detecting apparatus is so positioned with relation to the movable element 40 that an area of the front surface 14 of the photosensitive element 10 is not exposed to radiant energy from the source 25. This is the normal position of the element 40. Most of the radiant energy from the source 25 which would normally fall on the front surface 14 is blocked by the edge of the element 40. The voltage developed across the ohmic connections 17, 18, and 19 of the element 10 when the element 40 is in its normal position will be at a low value. The voltage output of the element 10 is proportional to the area of the front surface 14 exposed to radiant energy and is also proportional to the intensity of the radiant energy. The area of the p-n junction of the photosensitive element 10 is sufficiently large to cause significantly large voltages to be developed across the ohmic connections 17, 18, and 19 in response to movement of the movable element 40. The source 25 is located far enough away from the element 10 that it can provide substantially constant illumination across the front surface 14. When the element 40 is displaced downwardly, for example, the radiant energy from the source 25 will fall on a greater area of the front surface 14. The voltage developed across the ohmic connections 17, 18, and 19 when the element 40 is in its displaced position will be at a higher value. The voltage output of the element 10 is initially calibrated for the conditions present, and so the voltage change will be indicative of the extent of displacement of the element 40. Accordingly, leads 26 and 27 are connected to the strip 17 and the strips 18 and 19, respectively. The lead 27 is positive with respect to the lead 26. The leads 26 and 27 are also connected to the terminals 28 and 29, respectively, of the detecting device 30, which can be calibrated to show a physical displacement measurement in response to the voltage output of the element 10. When a static determination of the displacement of the element 40 is being made, the detecting device 30 may be any voltage-indicating device of sufficient sensitivity; for example, a direct-current oscilloscope, a vacuum tube voltmeter, or other sensitive voltmeter.

In order to effect dynamic measurements, the detecting device 30 is calibrated time-wise as well as voltage-wise. For example, the detecting device 30 may be an oscilloscope or an oscillograph. The data obtained in this manner can be used to determine the velocity of the moving element 40. FIG. 3 shows how the waveshape of the voltage changes developed by the photosensitive element 10 in response to movement of the element 40 can be interpreted. The waveshape at point 31 represents the extreme displacement of the element 40, while at 32 there is represented vibration or rapid change in direction of the element 40.

It will be apparent from the foregoing description that the detecting apparatus of the present invention provides an indication of vibration in movable parts, and dynamic motion indication of high-speed low-amplitude motions of movable parts. The present invention also provides, in conjunction with an accurate time base generator, an accurate high-speed displacement-versus-time diagram relative to a moving element, from which interpretations of high-speed movements of the element can be made.

While there have been shown and described and pointed out the fundamental novel features of the invention as applied to a preferred embodiment, it will be understood that various omissions and substitutions and changes in the form and details of the device illustrated and its operation may be made by those skilled in the art without departing from the spirit of the invention. It is the intention, therefore, to be limited only as indicated by the scope of the following claim.

What is claimed is:

Apparatus for measuring the extent of displacement of a movable element, which comprises:

(a) a source of radiant energy;

(b) a photovoltaic element comprising a silicon body including a zone of one conductivity type and contiguous thereto, for forming a large p-n junction, a surface zone of opposite conductivity type, and ohmic connections to the two zones for developing a voltage thereacross, the magnitude of the voltage developed across said ohmic connections being dependent upon the amount of area of said surface zone exposed to incident radiant energy from said source, and the area of said p-n junction being sufficiently large to cause significantly different voltages to be developed across said ohmic connections in response to various degrees of displacement of said movable element;

(c) means for directing radiant energy from said source to the surface zone of said photovoltaic element;

(d) means for arranging said source of radiant energy and said photovoltaic element relative to said movable element so that said movable element prevents radiant energy from said source from falling on a portion of said surface zone of said photovoltaic element, a displacement of said movable element causing more or less of said surface zone to be exposed to incident radiant energy from said source;

(e) and an electrical sensing means responsive to the voltages developed across said ohmic connections, said electrical sensing means being calibrated so that the magnitude of the change in the voltage developed across said ohmic connections as a result of the displacement of said movable element provides a measurement of the extent of said displacement.

References Cited in the file of this patent

UNITED STATES PATENTS

| | | |
|---|---|---|
| 1,455,795 | Logan | May 22, 1923 |
| 1,514,123 | Bacevicz | Nov. 4, 1924 |
| 1,672,672 | Young | June 5, 1928 |
| 2,339,204 | Stockbarger et al. | Jan. 11, 1944 |
| 2,401,712 | Turrettini | June 4, 1946 |
| 2,728,265 | Stimson et al. | Dec. 27, 1955 |
| 2,780,765 | Chapin et al. | Feb. 5, 1957 |
| 2,879,405 | Pankove | Mar. 24, 1959 |
| 2,886,718 | Shepherd et al. | May 12, 1959 |
| 2,896,086 | Wunderman | July 21, 1959 |
| 2,926,860 | Pomarico | Mar. 1, 1960 |
| 3,028,500 | Wallmark | Apr. 3, 1962 |
| 3,033,073 | Shuttleworth | May 8, 1962 |
| 3,038,079 | Mueller | June 5, 1962 |
| 3,093,741 | Meyer | June 11, 1963 |